United States Patent Office 3,081,244
Patented Mar. 12, 1963

3,081,244
PROCESS FOR POLYMERIZING UNSATURATED MONOMERS USING IONIZING RADIATION
Vincent A. Campanile, Moraga, Calif., assignor to Shell Oil Company, New York, N.Y., a corporation of Delaware
No Drawing. Filed Mar. 15, 1961, Ser. No. 95,831
12 Claims. (Cl. 204—154)

This invention relates to the polymerization of unsaturated monomers. More particularly, the invention relates to new process for polymerizing ethylenically unsaturated monomers using high energy ionizing radiation, to the high molecular weight polymers prepared thereby and to the utilization of the polymers.

Specifically, the invention provides a new and highly efficient process for preparing high molecular weight polymers of unsaturated monomers, and preferably unsaturated aldehydes, such as acrolein, which comprises exposing an aqueous medium containing the ethylenically unsaturated monomer and a small amount of an adduct of a preformed polymer of an unsaturated aldehyde and $SO_2$, to high energy ionizing radiation, such as, for example, a high energy stream of electrons or photons.

As a special embodiment, the invention provides a process for converting unsaturated aldehydes, such as acrolein, to high molecular weight polymers which are water-insoluble but have excellent solubility in aqueous $SO_2$ or bisulfite solutions and in basic solutions.

It is known that acrolein can be polymerized to high molecular weight insoluble polymers by redox polymerization techniques employing potassium persulfate and metal salts, such as iron sulfate. These polymers can be converted to a useful water soluble form by treatment with $SO_2$. These polymers, however, are generally discolored due to the presence of the metals, such as iron, which are difficult to remove. In addition the polymers prepared by this method are generally insoluble in basic solutions. Furthermore, the rate of conversion of monomers to polymer is low and the acrolein polymers obtained from this method do not have as high a molecular weight as desired for many applications.

Attempts have been made to correct some of these difficulties by the use of other types of polymerization techniques. Such attempts, however, have not proved satisfactory heretofore as the resulting products generally have a low molecular weight or they do not readily dissolve in aqueous $SO_2$ or sodium bisulfite or in basic solutions.

It is an object of the invention, therefore, to provide a new process for polymerizing unsaturated monomers to form high molecular weight polymers. It is a further object to provide a process for polymerizing unsaturated aldehydes, such as acrolein, to form polymers having a very high molecular weight. It is a further object to provide a method for converting unsaturated aldehydes to polymers which are readily soluble in aqueous $SO_2$ and sodium bisulfite. It is a further object to provide a process for converting unsaturated aldehydes to polymers which are soluble in dilute base. It is a further object to provide a method for preparing soluble polymers of unsaturated aldehydes which avoids the use of large amounts of corrosive materials. It is a further object to provide a method for producing polymers of unsaturated monomers which are substantially colorless. It is a further object to provide a process for polymerizing unsaturated monomers which effects a high conversion of monomer to polymers. It is a further object to provide high molecular weight substantially colorless polymers of unsaturated monomers and useful derivatives thereof. These and other objects of the invention will be apparent from the following detailed description thereof.

It has now been discovered that these and other objects may be accomplished by the process of the invention comprising exposing an aqueous medium containing the desired unsaturated monomer and a small amount of an adduct of a preformed polymer of an ethylenically unsaturated aldehyde and $SO_2$ to high energy ionizing radiation, such as a high energy stream of electrons or photons. It has been surprisingly found that the polymers obtained by this special technique have very high molecular weights and are almost double the molecular weight obtained by previous methods. Polymers prepared by this method, for example, preferably have intrinsic viscosities of at least 0.9 and preferably above 1.3.

In addition the unsaturated aldehyde polymers have good solubility in dilute base and in aqueous $SO_2$ and sodium bisulfite. Furthermore, the polymers are white powders free of discoloration as present in the prior known products. The new process is also characterized by the fact that it avoids the use of large amounts of corrosive materials and permits a free high conversion of monomer to polymer.

The process of the invention may be utilized for the homopolymerization or copolymerization of any ethylenically unsaturated monomers, i.e., any monomer containing a $>C=C<$ group and preferably a $CH_2=C<$ group. These materials may possess one or more ethylenic groups and may be aliphatic, cycloaliphatic, aromatic or heterocyclic in structure. Particularly superior results are obtained by the process of the invention when the monomer to be polymerized is one that can be polymerized by ionic polymerization, e.g., those that can be polymerized to greater than dimers by treatment with $AlCl_3$ at low temperature, e.g., $-10°$ C. to $-90°$ C. Examples of the monomers to be polymerized include, among others, isobutylene, isoamylene, styrene, vinyl acetate, alpha-methylstyrene, dichlorostyrene, methoxystyrene, isoprene, butadiene, methylpentadiene, methyl methacrylate, vinyl chloride, methacrylonitrile, vinyl chloride, vinyl alkyl ethers, as vinyl butyl ether, vinyl ketones, as vinyl butyl ketones, ethyl acrylate, allyl acetate, acrylonitrile and the like. Especially preferred monomers to be employed include the alpha-olefins and polyolefins containing up to 8 carbon atoms, the alkyl, chloro- and alkoxy-substituted styrenes and the acrylate esters.

The process of the invention may also be used to effect copolymerization of one or more of the above-described monomers with themselves or with other types of unsaturated monomers. Examples of these include, among others, ethylene, propylene, hexylene, decene, dodecene, piperylene, styrene, vinyl acetate, vinyl propionate, vinyl benzoate, diallyl phthalate, vinyl allyl phthalate, vinyl chloride, vinylidene chloride, methacrylonitrile, allyl amine, acrylamide, N-allyl acetamide, divinyl succinate, divinyl adipate, allyl acrylate, allyl butyl ether, allyl hexyl ether, diallyl ether, vinyl ethyl ketone, cyclohexenone, diacrylate ester of ethylene glycol, triallyl ether of glycerol, triallyl ether of hexanetriol and the like, and ethylenically unsaturated polyesters and alkyd resins.

In making the above-noted copolymers, it is generally preferred to utilize from 1% to 95% of the monomers capable of polymerizing by ionic polymerization with the remaining amount of the other type of monomer. Particularly preferred copolymers are those obtained by polymerizing at least 5% and preferably 5 to 95% by weight of an alpha-olefin or polyolefin with another olefin or polyolefin or an ethylenically unsaturated monomer substituted with an aromatic ring such as a styrene compound or one substituted with an electronegative group, such as ester groups, halogen atoms, nitrile groups, ether groups and ketone groups. Copolymers having outstanding properties are those containing from 10% to 99% by weight of an alpha-olefin and the remainder being a polyolefin such as butadiene or isoprene.

The process of the invention is particularly suited for use in polymerizing alpha,beta-ethylenically unsaturated aldehydes. The compounds have an ethylenic group in an alpha,beta-position relative to the aldehyde group, such as, for example, acrolein and alpha and beta-substituted acroleins, as methacrolein, alpha-ethylacrolein, alpha-butylacrolein, alpha-chloroacrolein, beta-phenylacrolein, alpha-decylacrolein, alpha-cyclohexylacrolein and the like. Preferred aldehydes to be employed in making the polymers include the alpha,beta-monoethylenically unsaturated monoaldehydes containing from 3 to 12 carbon atoms, and especially acrolein and the alpha- and beta-substituted acroleins where the substituent on the alpha and/or beta positions is an alkyl, cycloalkyl or aryl group containing no more than 8 carbon atoms. 2-alkenals containing up to 8 carbon atoms come under special consideration because of the superior results obtained in the process.

The process of the invention is also applicable to the homopolymerization or copolymerization of two or more of the above-described aldehydes as well as to the copolymerization of the above-described aldehydes with other ethylenically unsaturated monomers, and particularly those having a terminal $CH_2=C=$ group. Examples of such other monomers, includes, among others, butadiene, isoprene, methylpentadiene, ethylene, propylene, styrene, alpha-methylstyrene, vinylpyridine, vinyl pyrrolidone, allyl alcohol, acrylic and methacrylic acids and esters, vinyl acetate, allyl esters of monocarboxylic acids, vinyl halides, acrylonitrile, methacrylonitrile and the like. These monomers are preferably employed in amounts varying from about 0.1% to 60%, and more preferably from 1% to 25% by weight of the monomer mixture.

The polymerization is carried out in an aqueous medium containing the above-described monomer or monomers and an adduct of a preformed polymer of an unsaturated aldehyde and $SO_2$. These adducts are obtained by first polymerizing an unsaturated aldehyde such as described above by the present method or by any of the present known polymerization techniques for the unsaturated aldehydes and then dissolving the resulting polymer in aqueous $SO_2$. Suitable methods for polymerizing the unsaturated aldehydes to form the basic polymers are described in copending patent application Serial No. 859,156, filed December 14, 1959, and copending patent application, Serial No. 859,154, filed December 14, 1959. So much of the disclosure of these two applications relative to the preparation of the polymers and their $SO_2$ and sodium bisulfite derivatives is incorporated into this application.

The preparation of some of the acrolein polymers by the above-noted method is illustrated below.

POLYMER A 100 parts of acrolein was added to 400 parts of water, to this mixture was added .271 part of potassium persulfate, .203 part of ferrous chloride tetrahydrate, 1 part of nonyl-phenoyl-ethylene oxide adducts as anticoalescent agent and .4 part of disodium salt of ethylene diamine tetracetic acid. The resulting mixture was stirred for 24 hours at room temperature under atmosphere of nitrogen. During this period a white solid precipitated to the bottom. The mixture was filtered and the solid precipitate was washed with water and dried to yield 47 parts of polymer. The resulting product was a white powder polymer having an intrinsic viscosity (as determined on the sulfur dioxide solubilized form) of 1.8 dl./g.

POLYMER B 100 parts of acrolein was added to 300 parts of water and to this mixture was added .272 part potassium persulfate, .203 part of ferrous chloride tetrahydrate and .4 part of disodium salt of ethylene diamine tetraacetic acid. The resulting mixture was stirred for 25 hours at 0° C. under an atmosphere of nitrogen. During that period a white solid precipitated to the bottom. The mixture was filtered and the solid precipitate was washed with water and dried to yield 27 parts polymer. The resulting porduct was a white powder polymer having an intrinsic viscosity (as determined on the sulfur dioxide solubilized form) of 2.3 dl./g.

POLYMER C 1000 parts of acrolein was added to 2000 parts of water and to this mixture was added 2.73 parts of potassium persulfate, 2.02 parts ferrous chloride tetrahydrate, 10 parts of nonylphenol-ethylene oxide condensate and 4 parts of disodium salt of ethylene diamine tetraacetic acid. This mixture was stirred for 42 hours at room temperature (20° C.) under nitrogen. The resulting product was a white powder polymer having an intrinsic viscosity of 1.5.

POLYMER D 100 parts of acrolein was added to 325 parts of water and to this mixture was added 2.70 parts of potassium persulfate, 2.00 parts of ferrous chloride tetrahydrate and 4 parts of disodium salt of ethylene diamine tetracetic acid. This mixture was kept at room temperature for 6 hours with stirring and under an atmosphere of nitrogen. The resulting 46 parts product was a white powder polymer having an intrinsic viscosity of 1.02 dl./g.

The $SO_2$ adducts of the above-described high molecular weight polymers may be obtained by a variety of methods. They are preferably obtained by suspending the high molecular weight polymer in an aqueous solution containing the sulfur dioxide. The amount of the polymer added will vary depending on the particular agent involved and the concentration of the agent. In general, it is preferred to add from 1 to 50 parts of the polymer per 100 parts of water. The concentration of the solubilizing agent, e.g., the $SO_2$ will generally vary from 1% to 25%. Stirring and heating may be applied in the dissolution. Temperatures employed will generally vary from 20 to 30° C. to 90° C. Various other means such as addition of small amounts of acid catalyst or the addition of swelling agents as acetone may also be employed to assist in the dissolution.

The $SO_2$ adducts will have substantially the same molecular weight as the basic polymer. The adduct will contain a plurality of free sulfonate groups contained in the molecule and the products may therefore be regarded as high molecular polymeric polysulfonic acids. For example, the polymer may contain units, such as

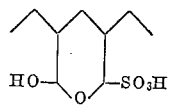

The formation of the adduct according to the above-described process is illustrated by the following preparation of an adduct of the above-described polymer A.

SOLUBILIZED POLYMER A 10 parts of the above-described polymer A was added to a 10% parts aqueous $SO_2$ solution and the mixture heated to 50° C. After a few minutes the polymer dissolved to form a clear solution. Evaporation of the water produced a white powder identified as an $SO_2$ adduct of polyacrolein having an intrinsic viscosity of about 1.8 dl./g.

The preferred adducts to be used in the process of the invention comprise the $SO_2$ adducts of polyacrolein having an intrinsic viscosity varying from about 0.3 to about 2.0.

Derivatives of the above-described $SO_2$ adducts, such as their salt, ester and the like derivatives may also be used in the process.

The amount of the adduct to be used in the process of the invention may vary over a considerable range. In general, the adduct is used in small amounts and preferably in amounts varying from .01% to about 10% by weight of the monomer to be polymerized and still more preferably in amounts varying from .1% to 2% by weight.

The aqueous medium may also contain various other types of stabilizing suspending, an emulsifying agent, pigments, plasticizing materials and the like depending upon the system desired. Best results, however, are generally obtained when the system consists only of the water, the unsaturated monomer and the adduct of the halide polymer and the $SO_2$ or sodium bisulfite.

In operating the process of the invention the monomer water and adduct and other desired materials may be combined in any order. It is generally preferred to add the adduct to the water and then add the desired amount of monomer to be polymerized.

The total amount of the unsaturated monomer to be added to the aqueous medium may vary over a considerable range depending upon the nature of the various ingredients, solubility of the monomer in water and the like. In most cases, it is preferred to maintain the ratio of the unsaturated aldehyde to water smaller than 1 to 2. When the ratio is larger than 1 to 2, the system sometimes becomes too thick to handle efficiently and it is necessary to add more water for an efficient operation. Preferred ratio of the unsaturated monomer to water in the aqueous system varies between about 1 to 3 and 1 to 8. In the case of acrolein, it is preferred to employ a saturated solution, i.e., about 20% solution.

It is desirable to agitate the aqueous medium during the polymerization. This may be accomplished by use of mechanical stirrers, tumbling of the reaction vessel and the like. Stirring is preferably accomplished at a rate of at least 50 r.p.m. and still more preferably 100 to 200 r.p.m.

The process is also preferably conducted in an inert atmosphere. This may be accomplished by the use of high vacuum or by the use of an inert atmosphere, such as an atmosphere of nitrogen, methane, ethane and the like.

The temperature employed during the polymerization process may vary over a wide range. In general, temperatures range from about —100° C. to 100° C., and more preferably from 10° C. to 80° C. With monomers, such as acrolein, particularly preferred temperatures range from 0° C. to about 50° C.

The process may be conducted at atmospheric, superatmospheric or subatmospheric pressures as desired.

The kind of radiation suitable for use in the present invention includes high energy electrons, protons and photons. Electron beams are suitably produced by electron accelerators such as the Van de Graaff, resonance transformers, and linear accelerators or by a suitable arrangement of certain isotopes, e.g., strontium 90. High energy photons suitable for use are, for example, X-ray produced by conventional X-ray tubes and electron accelerators and gamma rays which may be produced by decay of radioactive material such as cobalt 60, cesium 137 and fission products. Although somewhat different effects may be observed in irradiation by heavy particles, the present invention also contemplates particularly the use of the high energy protons or neutrons. Proton beams are produced, for example, by accelerators such as Van de Graaff, linear accelerators and cyclotrons. Fast neutrons may be obtained within a nuclear reactor or may be obtained as a beam out of a nuclear reactor. Fast neutrons act on hydrocarbons mainly by transferring their energy to protons, which, being charged, induce ionization and excitation as they pass through the monomer mixture.

The devices suitable for producing beams of electrons, protons, X-rays, fast neutrons and slow neutrons are well known in the art and need not be described herein in detail.

Methods and apparatus for irradiating materials by means of radiation resulting from decay of radioactive substances are also well known. Sources such as rods containing a high concentration of cobalt 60 are used in various arrangements for the irradiation of materials as described, for example, in the paper by Burton et al., Nucleonics, 13 (No. 10–74 (1955)) and references cited therein.

A preferred process comprises exposing the monomer mixture to radiation by passing it through a nuclear reactor which may at the same time be employed for power producing purposes or may be utilized exclusively for polymerization. A suitable reactor is described in substantial detail in the Fermi et al. patent U.S. 2,708,656.

Preferred ionizing radiation is that which has the power to penetrate to a substantial depth, i.e., at least about 1 centimeter, into a mass of the monomer in condensed phase. This is sometimes referred to herein as radiation of substantial penetrating power. In this operation, the monomer mass is exposed to such radiation from a source which is not finely dispersed within said mass. The radiation may be introduced into the condensed mass, held in a vessel, through a suitable window in the vessel or by placing an intensive source of radiation, such as a canned mass of gamma-ray emitter, into the vessel containing the monomer.

The total dosage employed in the polymerization may vary over a wide range depending on the particular monomer utilized. Preferred total dosage varies from about $10^5$ to $5 \times 10^6$ rads; dosages of up to $5 \times 10^7$ rads or more, calculated on the total mixture, may be employed if polymer is removed from the irradiation zone after it is formed. A rad is defined as 100 ergs of ionizing energy absorbed per gram of irradiated mixture.

The dosage rate will also vary considerably. Preferred dosage rates vary from about $10^4$ to $10^{12}$ rads per hour, and still more preferably $10^5$ to $10^{10}$ rads per hour. In systems in which the radiation reaches only a portion of the total mass of monomer contained in a vessel, e.g., where an electron beam penetrates only into the upper part of a vessel, the dose rate calculated on the basis of the amount of material in the volume actually reached by the radiation is called the "instantaneous dose rate." The above numerical values are applicable.

The polymer formed during the process will precipitate out as a white solid and may be recovered by any suitable means, such as filtration, centrifugation and the like. After recovery, it is generally desirable to wash the polymer with water and acetone and then dry the product.

The polymers obtained by the process of the invention are solid substantially white high molecular weight products. They preferably have intrinsic viscosities (as determined on the solubilized form) of at least 0.3 and preferably 0.9 to 3.0. These values are determined by the conventional technique of polyelectrolyte viscosity measurements at 25° C. On a mol weight basis, such polymers preferably have molecular weights ranging from about 100,000 to 2,000,000 as determined by the light scattering technique.

The polymers may be utilized in a variety of applications as they can be molded to form plastic objects or may be melt or cast as coatings and the like. The soluble products may also be used in the preparation of surface coating, impregnating agents and the like.

The polymers of unsaturated aldehydes obtained by the process are characterized by the fact that they possess a high percent of theoretical aldehyde function, i.e., when the polymer is subjected to conventional test for presence of aldehyde groups (e.g., addition of hydroxylamine hydrochloride and titrate liberated water with Karl Fischer reagent) the results show the high percent, i.e., over 95% of the theoretical aldehyde groups present by addition polymerization at the double bonds are present in the polymer as such or in hydrated form. Further analysis has shown that the polymer contains many groups wherein the aldehyde is in a hydrated form as wherein R is hydrogen or hydrocarbon and particularly alkyl, cycloalkyl and aryl radicals containing 1 to 10 carbon atoms. This clearly distinguishes the polymer of the invention from those produced by conventional methods wherein the polymer possesses at most only 60–75% of the theoretical aldehyde function.

The aldehyde polymers are also characterized by being insoluble in water and conventional solvents, such as benzene, toluene, acetone and the like.

The aldehyde polymers are also characterized by being reactive with aqueous sulfur dioxide and alkali metal bisulfites and react themselves to form water-soluble derivatives. These water soluble derivatives are preferably prepared by suspending the high molecular weight polymer in an aqueous solution containing the water-solubilizing agents, such as the sulfur dioxide or bisulfite. The amount of polymer added will vary depending on the particular agent involved and the concentration of the agent. In general, it is preferred to add from 1 to 50 parts of the polymer per 100 parts of water. The concentration of the solubilizing agent will generally vary from about 1% to about 25%. Stirring and heating may be applied to assist in the dissolution. Temperatures employed will generally vary from about 20° C. to about 90° C. Various other means, such as addition of small amounts of acid catalyst or the addition of swelling agents as acetone, tetrahydrofuran may also be employed in the dissolution.

The water-soluble derivatives prepared as above will have substantially the same molecular weight as the water-insoluble basic polymer. In case of the sulfur dioxide and alkali metal bisulfites, the polymer will also contain a plurality of free sulfonic groups or water-soluble salt sulfonate groups contained in the polymer molecule and, therefore, may be regarded as polymeric polysulfonic acids and polymeric polysulfonate metal salts.

The water-solubilized polymers may be used for a great many applications. As water solutions, they may be used in the formation of films, threads, treatment of animal skins, and the like, and as coatings for various materials as wood, metal and the like.

The polymers solubilized with alkali bisulfites and aqueous sulfur dioxide have been found to be particularly useful as wet strength agents for paper. In this application, the polymers may be applied during the beater stage or as an after-treatment for the paper. Preferably the aqueous solution of the polymer is added during the beater stage when the suspension of paper pulp is being rapidly agitated. This addition may be at the beginning of the beater stage or intermittently or at the end of the operation. If the aqueous solution is applied to the finished paper, it may be added by spraying or by rollers or by dipping or running the paper through the conventional padding apparatus.

After the aqueous solution has been applied to the paper as indicated above, the treated product is subsequently dried to effect cure. The drying may be accomplished by merely rolling or squeezing off the excess solution and then setting out in the air to dry or by using forced air. Temperatures used in the drying may vary from about room temperature, e.g., about 20° C. to 100° C. The period of drying will depend largely on the amount of pick-up and concentration of the polymer solution. In most instances, drying periods of from about 1 to 30 minutes should be sufficient.

Any type of paper may be treated according to the above process. Examples of such paper include, for example, those prepared from wood, cotton, linen, hemp, jute, mulberry, straw, bamboo, cane and agone fibers or mixtures thereof, by any of the known processes such as the sulfate process, soda process and sulfite process. The paper may be colored or white and may be further treated for special applications.

The above-described water-soluble derivatives obtained by treatment with agents such as sulfur dioxide and alkali metal bisulfite may be reacted with alkali to form new polyhydroxy polycarboxylic acids or salts. This is accomplished by suspending or dissolving the polymer derivative into a solution of basic material which has a dissociation constant greater than $2.0 \times 10^{-5}$. The basic materials used in the reaction are preferably the alkali metal hydroxides, alkaline earth metal hydroxides, strong amines, ammonium hydroxide and the like. Preferred materials are the water-soluble hydroxides and basic salts of the alkali metals as sodium, potassium, lithium and ammonium hydroxide and basic salts. The pH of the reaction mixture preferably is between 8 and 14. When expressed on a normality basis, it is preferred to use reaction media having a normality greater than 0.1 N and preferably between 0.5 N and 10 N.

The degree of alkalinity employed will vary depending on the degree of conversion of the aldehyde or hydrated aldehyde groups to the OH and carboxyl groups. Theoretically, one mol of caustic is needed for every two aldehyde groups converted. To obtain a high degree of conversion, such as 70 to 90% conversion, solutions of higher normality should be employed, while for the lower conversions lower normality may be utilized.

The temperature employed in the reaction with the alkali may vary over a wide range. Preferred temperatures range from about 0° C. to 60° C.

In most cases, the polymer derivative will dissolve in the alkaline medium in a few minutes and the reaction should be complete in the matter of a few hours. Reaction times generally vary from about 20 minutes to about 50 hours.

At the conclusion of the reaction, the hydroxy-polycarboxylic acid derivative may be recovered in salt form by evaporation, crystallization and the like, or the reaction mixture may be treated with an acid to recover the product as the polyhydroxy polycarboxylic acid rather than the corresponding salt. This is accomplished by merely adding acids, such as hydrochloric, sulfuric or the like, in dilute form to the mixture until the product precipitates. This is at a pH of about 3 to 5. The precipitate is then preferably washed and dried.

The resulting hydroxy carboxylic acids prepared as above will vary from thick liquids to solids. They are useful as cross-linking agents for polyepoxides, and in the formation of new ester and salt derivatives.

Salts of the polymeric hydroxy carboxylic acids, and preferably the ammonia, alkali metal or alkaline earth metal salts, are valuable as dispersing agents and emulsifying agents, as soil conditioners, self-polishing waxes, dry and wet strength agents for paper, sizing agents for paper and textile fibers, crease and shrink-proofing agents for textiles and the like.

To illustrate the manner in which the invention may be carried out, the following examples are given. It is to be understood however, that the examples are for the purpose of illustration, and the invention is not to be regarded as limited to any of the specific conditions recited therein. Unless otherwise indicated, parts are parts by weight.

*Example I*

This example illustrates the unexpected superior results obtained by polymerizing an unsaturated aldehyde in an aqueous medium containing the adduct of a preformed polyacrolein and sulfur dioxide using high energy ionizing radiation as the energy source.

(A) Acrolein was added to water to form a 20% solution. A polyacrolein-$SO_2$ adduct formed as noted above and having an intrinsic viscosity of about 2.26 dl./g. was added to that solution so as to form an 0.2% solution of the adduct. This mixture was then placed in a glass reactor and the air swept out with nitrogen. The reactor was sealed and exposed to X-rays at room temperature. The dose rate was $1.8 \times 10^5$ rads per hour. Reaction time was 1½ hours. At the conclusion of the exposure time, the reactor was opened and the solution filtered to remove the solid polymer. There was a 40% conversion to polymer. The resulting polymer was a white powder having an intrinsic viscosity of 2.23 dl./g. (as determined on the sulfur dioxide solubilized form). The polymer was insoluble in water and solvents, such as benzene and acetone, but was soluble in 1 N NaOH and aqueous sulfur dioxide and sodium bisulfite.

(B) The above experiment was repeated with the exception that the reaction medium contained only water and the acrolein. In this case, the resulting polymer was insoluble in aqueous sulfur dioxide and sodium bisulfite.

(C) The above experiment was again repeated with the exception that the reaction medium contained 1% phosphoric acid in addition to water and acrolein. In this case, the polymer obtained was soluble in aqueous sulfur dioxide but insoluble in dilute sodium hydroxide. In addition, the product had a lower intrinsic viscosity and lower conversion.

*Example II*

A 2% solution of the sulfur dioxide-solubilized polymer of acrolein prepared as in Example IA was prepared and sheets of bleached sulfite paper passed into and through the solution. The treated sheets were then pressed out on dry paper and allowed to dry at room temperature. The resulting product had the appearance, feel and flexibility of the untreated polymer but demonstrated improved wet strength, fold endurance and good dimensional stability.

*Example III*

Example IA was repeated with the exception that the sulfur dioxide adduct used in the reaction was a polyacrolein-SO₂ adduct having an intrinsic viscosity of 1.5 dl./g. The resulting product was a high molecular weight polyacrolein which was soluble in 1 N NaOH and aqueous sulfur dioxide and sodium bisulfite.

*Example IV*

Acrylonitrile was added to water to form a 20% solution. A polyacrolein-SO₂ adduct formed as noted above and having an intrinsic viscosity of about 2.26 dl./g. was added to the solution so as to form an 0.2% solution of the adduct. This mixture was then placed in a glass reactor and the air swept out with nitrogen. The reactor was sealed and exposed to X-rays at room temperature. The dose rate was $1.8 \times 10^5$ rads per hour. Reaction time was 1½ hours. At the conclusion of the exposure time, the reactor was opened and the solution filtered to remove the solid polymer. There was a high conversion of monomer to polymer. The resulting polymer was a white powder which could be molded to form valuable plastic articles.

*Example V*

Example IV was repeated with the exception that the acrylonitrile is replaced by each of the following: ethyl acrylate, butyl acrylate, vinyl acetate, styrene and alpha-methylstyrene. Related results are obtained.

*Example VI*

100 parts of acrolein was added to 500 parts of water containing 1 part of a polyacrolein-sulfur dioxide adduct having an intrinsic viscosity of 2.26 dl./g. This mixture was placed in a glass reactor, the air swept out with nitrogen, the reactor sealed and exposed to X-ray beams at 25° C. The dose rate was $1.8 \times 10^5$ rads/hr. The exposure time was about 2 hours. At the conclusion of the exposure time, the reactor was opened and the solution filtered to remove the white solid polymer. The resulting polymer was a white powder having an intrinsic viscosity (as determined on the solubilized form) of 1.6 dl./g. The polymer was insoluble in water and solvents, such as benzene and acetone, but was dissolved in dilute NaOH and aqueous sulfur dioxide.

A 2% water solution of the SO₂-solubilized polymer was prepared and sheets of bleached sulfite paper into and through the solution. The treated sheets were then pressed out on dry paper and allowed to dry at room temperature. The resulting product had the appearance, feel and flexibility of the untreated paper, but demonstrated unexpected improvement in fold endurance, dimensional stability, and resistance to hydrolysis and improvement in wet strength.

*Example VII*

100 parts of acrolein was added to 500 parts of water containing 1.5 parts of a polyacrolein SO₂ adduct having an I.V. of 0.9 dl./g. This mixture was then placed in an ampoule and the container degassed and sealed off. The sealed ampoule was then tumbled end-over-end and exposed to X-ray beam. The dose rate was $7 \times 10^6$ rads per hour with a total dose of $2.3 \times 10^6$ rads per hour. At the conslusion of the exposure time, the ampoule was opened and the solution filtered to remove the white solid polymer. The resulting product was a white powder having an intrinsic viscosity of 1.0 dl./g. The polymer was insoluble in water and solvents, such as benzene and acetone, but dissolved in dilute NaOH and in aqueous sulfur dioxide.

*Example VIII*

Example I was repeated with the exception that the acrolein was replaced with methacrolein. Related results are obtained.

*Example IX*

Examples IA to V are repated with the exception that the temperature employed was 50° C. Related results are obtained.

*Example X*

Example IA is repeated with the exception that the acrolein is replaced with a mixture of 90 parts acrolein and 10 parts of acrylonitrile. A high molecular weight solid copolymer was obtained.

*Example XI*

Examples IA to X are repeated with the exception that the aqueous medium is exposed to high energy protons and to X-rays. Related results are obtained.

*Example XII*

Example IA is repeated with the exception that the acrolein is replaced by a mixture of 80 parts acrolein and 20 parts ethyl acrylate. A high molecular weight solid copolymer is obtained.

*Example XIII*

Example I was repeated with the exception that adduct employed was a sodium bisulfite adduct of polyacrolein having an I.V. of 0.6 dl./g.

*Example XIV*

100 parts of acrolein was added to 500 parts of water containing 1 part of a polyacrolein-SO₂ adduct having an I.V. of 1.1 dl./g. This mixture was placed in a glass reactor and the air swept out with nitrogen and the reactor was sealed and exposed to an X-ray beam at 25° C. The dose rate was $1.8 \times 10^4$ rads with a total dose of $7.2 \times 10^4$. The resulting polymer had an intrinsic viscosity of 1.9 dl./g., G value was 12,700.

I claim as my invention:
1. A process for polymerizing ethylenically unsaturated monomers to form high molecular weight polymers which comprises exposing an aqueous medium containing the unsaturated monomer to be polymerized and from about .01% to 10% by wegiht of said monomer of a poly- sulfonic acid derivative of a polymer of an unsaturated aldehyde to high energy ionizing radiation.

2. A process for polymerizing the alpha,beta-ethylenically unsaturated monomers which comprises exposing an aqeuous medium containing the unsaturated monomer and from about .01% to 10% by weight of said monomer of a polysulfonic acid derivative of a polymer of acrolein to $10^5$ to $10^8$ rads of high energy ionizing radiation at a temperature between 0° C. and 100° C.

3. A process as in claim 2 wherein the unsaturated monomer is acrolein.

4. A process as in claim 2 wherein the unsaturated monomer is methacrolein.

5. A process as in claim 2 wherein the unsaturated monomer is acrylonitrile.

6. A process as in claim 2 wherein the aqueous medium is exposed to an electron beam.

7. A process as in claim 2 wherein the aqueous medium is exposed to high energy protons.

8. A process as in claim 2 wherein the monomer is exposed to X-rays.

9. A process for polymerizing acrolein to form high molecular weight polymers which are soluble in dilute base and aqueous $SO_2$ which comprises exposing an aqueous medium containing acrolein and .01% to 10% by weight of a polysulfonic acid derivative of a polymer of acrolein to high energy ionizing radiation at a temperature between 10° C. and 50° C.

10. A process as in claim 9 wherein the polysulfonic acid derivative of the polymer of acrolein has an intrinsic viscosity of 0.3 to 3.0 dl./g.

11. A process as in claim 9 wherein the polysulfonic acid derivative of the polymer of acrolein has an intrinsic viscosity of 0.9 to 2.0 dl./g.

12. A process for polymerizing acrylonitrile to form a high molecular weight polymer which comprises exposing an aqueous medium containing acrylonitrile and .01% to 10% by weight of a polysulfonic acid derivative of a polymer of acrolein to high energy ionizing radiation at a temperature between 10° C. and 50° C.

References Cited in the file of this patent

UNITED STATES PATENTS

| | | |
|---|---|---|
| 2,836,553 | Guthrie et al. | May 27, 1958 |
| 2,909,508 | Jones | Oct. 20, 1959 |